…

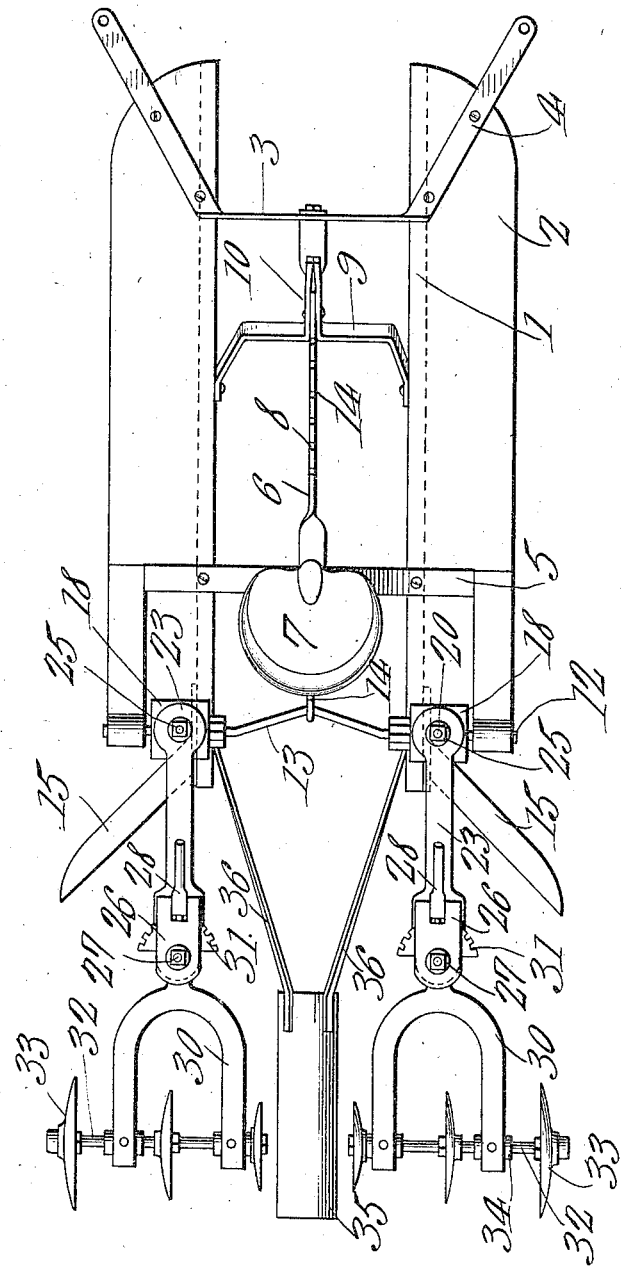

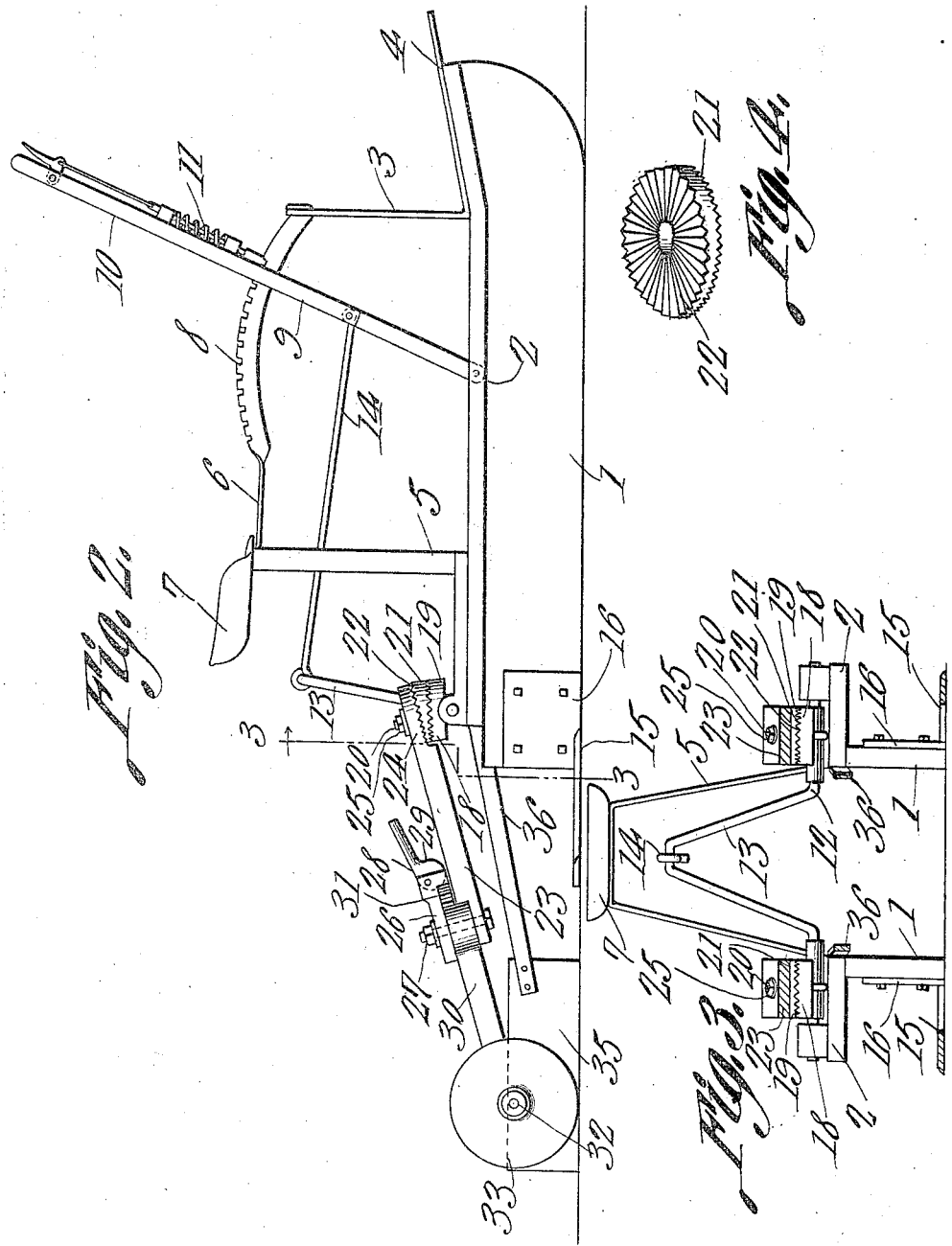

UNITED STATES PATENT OFFICE.

ROBERT W. CROSSMAN, OF TEXOLA, OKLAHOMA, ASSIGNOR OF ONE-HALF TO JOHN E. WALKER, OF TEXOLA, OKLAHOMA.

HARROW.

985,980.

Specification of Letters Patent.

Patented Mar. 7, 1911.

Application filed September 26, 1910. Serial No. 583,903.

*To all whom it may concern:*

Be it known that I, ROBERT W. CROSSMAN, a citizen of the United States, residing at Texola, in the county of Beckham and State of Oklahoma, have invented a new and useful Harrow, of which the following is a specification.

This invention has relation to harrows of the cultivator type and consists in the novel construction and arrangement of its parts as hereinafter shown and described.

The object of the invention is to provide in the form of a cultivator adapted to straddle a row of plants when in operation, means for operating upon the soil at the opposite sides of the row of plants to cut out weeds and undesirable vegetation and at the same time work or cultivate the top soil in an advantageous manner.

With this object in view the harrow includes runners which are connected together by a frame structure and to which draft animals are attached. The said runners are provided at their upper edges with laterally disposed portions or platforms and to the rear end portions of the runners and behind the rear end of the said platforms are attached blades which are adapted to operate in a horizontal line at or below the surface of the soil. A shaft is journaled for rotation at the rear portions of the runners and is provided with an intermediate arched portion which is approximately vertically disposed and a lever mechanism is mounted upon the runners and is adapted when manipulated to swing the said shaft. Rearwardly disposed arms are adjustably connected to the shaft and are so mounted that they may be swung in lateral directions at their rear ends and secured in adjusted position. Yokes are pivotally connected to the rear ends of the said arms and means are provided for securing the said yokes in adjusted positions. The gang of harrows is journaled for rotation upon each yoke and a fender is connected with the said runners and is adapted to lie between the gang of disks at the opposite sides of the harrow.

In the accompanying drawings,—Figure 1 is a top plan view of the harrow. Fig. 2 is a side elevation of the same. Fig. 3 is a transverse sectional view of the same cut on the line 3—3 of Fig. 1. Fig. 4 is a perspective view of a washer which is used upon the harrow.

The harrow consists of vertically disposed runners 1 which are provided at their upper ends with laterally disposed platforms 2. The said runners are connected together by a frame work which is mounted upon the said runners and which consists of an arched bar 3 the intermediate portion of which is spaced between the said runners and said arched bar is provided with end portions 4 which are forwardly and outwardly disposed and which project beyond the forward ends of the platforms 2 and to which draft animals may be attached. An arched bar 5 connects the rear end portions of the said runners 1 together and a longitudinally disposed bar 6 connects said arched bars 3 and 5 together. An operator's seat 7 is mounted upon the arched bar 5 and the intermediate portion of the bar 6 is formed in the arc of a circle and is provided with notches 8. A lever 9 is fulcrumed to the intermediate portions of the runners 1 and is also in the form of an arch which bridges the space between the runners and is provided with an intermediate handle portion 10 which straddles the bar 6. A spring actuated pawl 11 is mounted upon the lever 9 and is adapted to enter the notches 8 provided at the intermediate arched portion of the said bar 6. The shaft 12 is journaled for rotation at the rear end portions of the runners 1 and is provided with an intermediate crank or arched portion 13. A rod 14 is pivotally connected at its rear end to the intermediate portion of the crank or arch 13 of the shaft 12 and at its forward end is connected with the lever 9. Therefore it will be seen that by swinging the lever 9 that the rod 14 will be moved longitudinally and the arched portion 13 of the shaft 12 will be swung about the axis of said shaft and thus the parts of the harrow (hereinafter to be explained) which are fixed to the end portions of the shaft 12 may be raised or lowered.

Blades 15 are provided at their inner ends with vertically disposed plates 16 which are attached to the outer sides of the runners 1 and said blades 15 are horizontally disposed with the forward cutting edges 17 diverging from each other toward their rear ends at acute angles to the planes of the runners 1. The forward ends of the blades 15 are located at or behind the rear ends of the platform 2 mounted upon the runners 1 so that when said blades engage the flange at the surface of the ground the said flange will not be wedged between the inner end portions of the blades and the rear end portions of the said platforms.

Blocks 18 are fixed to the end portions of the shaft 12 and are provided upon their upper faces with serrations 19. The lower ends of bolts 20 are fixed to the blocks 18 and wedge shaped washers 21 are located upon the bolts 20 and rest at their lower sides upon the serrated surfaces 19 of the blocks 18. The said wedge shaped washers 21 are provided at their upper and lower sides with serrations 22. Arms 23 are mounted at their forward ends upon the bolts 20 and are provided with serrations 24 which engage the upper serrations 22 of the washers 21. Clamp nuts 25 are screw threaded upon the upper ends of the bolts 20 and hold the arms 23 in close contact with the washers 21 and also hold the said washers firmly down against the upper surfaces of the blocks 18. Thus it will be seen that by loosening the nuts 25 that the arms 23 may be swung upon bolts 20 as axes and also the washers 21 may be turned about the said bolts 20 and when the arms 23 have a desired shape or slant both laterally and rearwardly the said nuts 25 may be tightened whereby the said arms will be secured in the said adjusted position. Clips 26 are mounted upon the rear ends of the arms 23 and are held upon the said arms by means of bolts 27 which pass transversely through the rear end portions of the said arms and the rear end portions of the said clips 26 are spaced from the rear end portions of the arms 23 and the levers 28 are fulcrumed upon the clips 26. The levers 28 are provided with cam working ends 29. Yokes 30 are pivotally mounted at their forward ends upon the bolts 27 and are provided with dentate segments 31 which lie under the intermediate portions of the clips 26 and are adapted to be engaged by the cam ends 29 of the levers 28 whereby said yokes 30 are secured in adjusted positions upon the bolts 27 and at desired angles with relation to the arms 23. A shaft 32 is journaled at the rear end of the yoke 30 and a gang of disks 33 is mounted upon the shaft 32. The shafts 32 are journaled in boxes 34 which are attached to the rear end of the yokes 30 and the said boxes may be provided with sand guards of wood or other material if desired. A fender 35 is provided for the arrow and preferably consists of a piece of sheet metal which is arched longitudinally and which is connected at its forward end portion and at its opposite side with the rear ends of the runners 1 by means of resilient arms 36. The fender is designed to move between the inner ends of the shafts 32.

In operation the harrow is drawn along a row of standing plants so that the runners 1 pass at the opposite sides of the row. As the weeds and other undesirable plants located adjacent the sides of the row of plants which is being cultivated are encountered by the blades 15, the said undesirable plants are cut down and left upon the surface of the soil approximately at the same point at which they stood. The disks 33 then operate upon the surface of the soil and turn or cut into the same according to their angles of disposition and at the same time the fender 35 passes over the standing plants and protects the same from the soil passed up by the disk 33. By manipulating the lever 10 the shaft 12 is turned as above described and thus the arms 23 and their attachments may be swung up or down as desired. Also prior to operating the harrow adjacent a row of standing plants said arms 23 have been properly positioned with relation to the shaft 12 and the runners 1 and the yokes 30 have been properly positioned with relation to the said arms 23.

Having described the invention what I claim as new and desire to secure by Letters Patent is:—

A harrow comprising spaced vertically disposed runners in parallel relation, arched members connecting said runners together, an arched shaft journaled for rotation at the rear end portions of the runners, an arched lever fulcrumed upon the runners, means operatively connecting said lever with the arch of said shaft, means for holding the lever in an adjusted position, outwardly and rearwardly disposed blades secured to the rear end portions of the runners, arms connected with said shaft and adapted to be adjusted at their rear portions both horizontally and axially upon their points of connection with the shaft, and means for fixing said arms in their adjusted positions with relation to the shaft, yokes connected with the rear ends of said arms for horizontal adjustment with relation thereto, and gangs of earth-engaging members carried by said yokes and trailing behind said blades.

In testimony that I claim the foregoing as my own, I have hereto affixed my signature in the presence of two witnesses.

ROBERT W. CROSSMAN.

Witnesses:
A. H. SKILLERN,
L. A. CHAFFIN.